(12) United States Patent
Yotsukura (10) Patent No.: US 6,560,771 B1
(45) Date of Patent: May 6, 2003

(54) SYSTEM AND METHOD FOR REUSING A CLASSED METHOD IN OBJECT ORIENTED PROGRAMMING

(75) Inventor: Mikio Yotsukura, Tokyo (JP)

(73) Assignee: Class Technology Co., Ltd., Tokyo (JP)

( * ) Notice: Subject to any disclaimer, the term of this patent is extended or adjusted under 35 U.S.C. 154(b) by 0 days.

(21) Appl. No.: 09/568,468

(22) Filed: May 10, 2000

(30) Foreign Application Priority Data

Dec. 16, 1999 (JP) .......................................... 11-357379

(51) Int. Cl.[7] ............................................... G06F 9/44
(52) U.S. Cl. ...................... 717/116; 717/106; 717/118; 707/103 R; 707/103 Y; 345/700; 345/810
(58) Field of Search ........................ 707/103 R, 103 Y; 717/101, 105, 106, 108, 116, 118; 709/310–332; 345/810, 700

(56) References Cited

U.S. PATENT DOCUMENTS

| | | | | |
|---|---|---|---|---|
| 5,560,012 A | * | 9/1996 | Ryu et al. ..................... | 717/104 |
| 5,673,320 A | * | 9/1997 | Ray et al. ...................... | 283/17 |
| 5,699,527 A | * | 12/1997 | Davidson ...................... | 705/38 |
| 5,704,029 A | * | 12/1997 | Wright, Jr. .................... | 345/173 |
| 5,724,589 A | * | 3/1998 | Wold ........................... | 709/318 |
| 5,825,003 A | * | 10/1998 | Jennings et al. ............... | 235/379 |
| 5,835,724 A | * | 11/1998 | Smith ....................... | 707/501.1 |
| 5,870,721 A | * | 2/1999 | Norris .......................... | 705/35 |
| 5,878,403 A | * | 3/1999 | DeFrancesco et al. ........ | 705/35 |
| 5,889,991 A | * | 3/1999 | Consolatti et al. ........... | 717/108 |
| 5,907,704 A | * | 5/1999 | Gudmundson et al. ..... | 717/100 |
| 5,920,718 A | * | 7/1999 | Uczekaj et al. ............. | 320/112 |
| 6,058,373 A | * | 5/2000 | Blinn et al. .................... | 705/22 |
| 6,061,516 A | * | 5/2000 | Yoshikawa et al. ......... | 717/109 |
| 6,223,983 B1 | * | 5/2001 | Kjonaas et al. ............. | 235/379 |
| 6,237,135 B1 | * | 5/2001 | Timbol ........................ | 717/107 |
| 6,269,475 B1 | * | 7/2001 | Farrell et al. ............... | 717/113 |
| 6,385,769 B1 | * | 5/2002 | Lewallen ..................... | 717/116 |
| 6,434,598 B1 | * | 8/2002 | Gish ........................... | 709/203 |

OTHER PUBLICATIONS

Srinivasan et al., Object–Oriented Reused: Experience in Developing a Framework for Speech Recognition Applications, 1998, IEEE, pp. 322–330.*

Bieman et al., Reuse Through Inheritance: A Quantitative Study of C++ Software, 1995, ACM, pp. 47–52..*

* cited by examiner

*Primary Examiner*—Jean R. Homere
*Assistant Examiner*—Leslie Wong
(74) *Attorney, Agent, or Firm*—Foley & Lardner (57) ABSTRACT

An Information Processing System includes a method display unit that displays the methods belonging to a class, a method selection unit that selects the desired method from among the methods displayed, a new class creation unit that creates program source code that indicates the new class using the selected methods, a compiling unit that compiles the above discussed program source code and creates the execution file, and an information processing unit that executes the above discussed execution file and conducts the information processing defined by the method within the new class. By this system, it is possible to construct a highly productive and highly maintainable information processing system.

13 Claims, 8 Drawing Sheets

CONFIGURATION SCREEN

EVENT NAME  ▶   METHOD NAME ▶ — METHOD DISPLAY SELECTION WINDOW 71

| EVENT NAME | INDENT | ACTION | METHOD NAME |
|---|---|---|---|
| SAM_Click | 0 | If | NOT fun input check( ) |
| SAM_Click | 1 | Return | FALSE |
| SAM_Click | 0 | If | NOT SalSendClassMessage( SAM_Click,0,0) |
| SAM_Click | 1 | Call | pbDBConnect.RollBack( ) |
| SAM_Click | 1 | Return | FALSE |
| SAM_Click | 0 | Call | pbDBConnect.Commit( ) |
| SAM_Click | 0 | Call | SalMessageBox('Renewed','OK',MB_OK) |

↖ A

SOURCE DISPLAY WINDOW 72

← ↓ ↑ →    RELOAD    OK (74)    CANCEL

ADD  DELETE

METHOD CONFIGURATION SCREEN 70

SYSTEM AND METHOD FOR REUSING A CLASSED METHOD IN OBJECT ORIENTED PROGRAMMING

BACKGROUND OF THE INVENTION

1. Field of the Invention

This invention relates to information processing system and information processing methods using classes applied to object oriented technology. In particular, this invention concerns technology that makes possible the construction of information processing systems with high productivity and high maintainability, by reusing methods within classes.

2. Description of the Related Art

At present, object oriented technology, utilizing software parts called "classes", is actively used in a great variety information processing fields, such as software engineering and database construction.

It is considered that one of the reasons for this is that because with information processing using object oriented technology, it is possible to conduct function succession with class units. Also, compared with information processing systems written and constructed in high-level languages like C and COBOL, it is easier to update information processing content.

Figure 1:
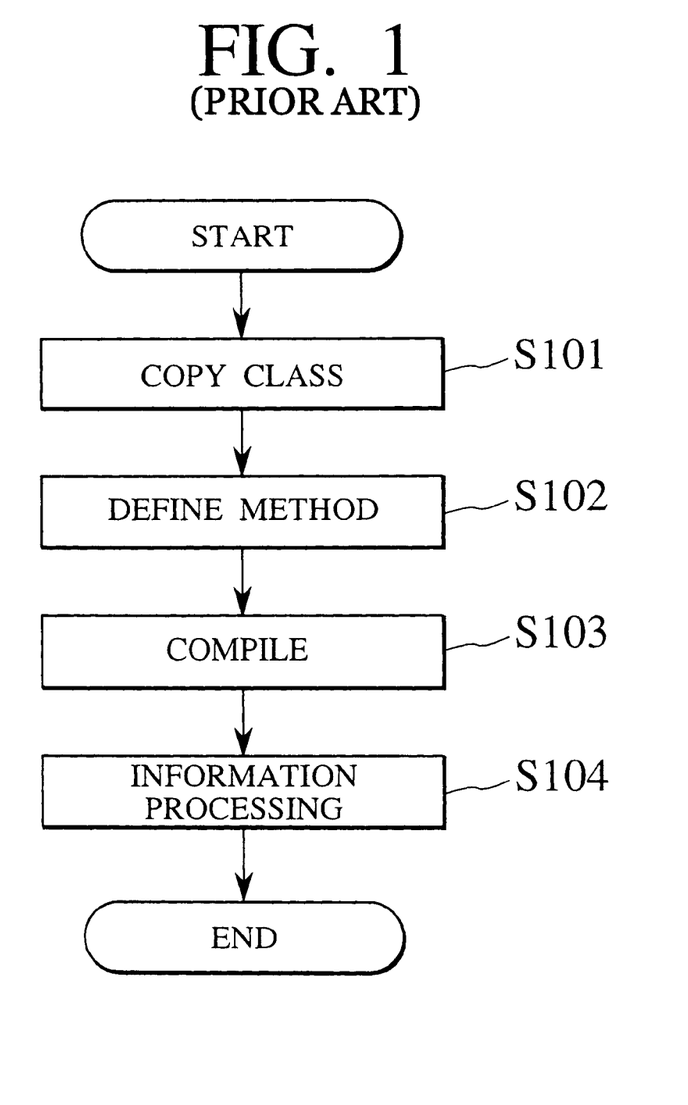
FIG. 1 is a flowchart diagram illustrating the information processing method of a related art.

The class function succession method in information processing systems of a related art using object orientation technology be explained with reference to FIG. 1.

In a related art, succession of class functions in information processing was generally executed in the following steps.

(a) The desired class is copied from a repository housing the data relating to the class (class copy step, S101).

(b) Within the copied class, a new method is coded that indicates the information processing contents to be executed, and program source code is created (method definition step, S102). Here, a method (same definition as operation, service) means the functions to be executed by each class, with the method (same definition as event, request) starting according to instructions received.

(c) The program source is compiled using a compiler and the execution file is created (compiling step, S103).

(d) Execute the execution file within the computer system and realize the information processing contents defined by the methods (information processing step, S104).

As described above, within the information processing system of a prior art using object oriented technology, new information processing is realized by function succession of the existing classes and adding methods within them.

Figure 2:
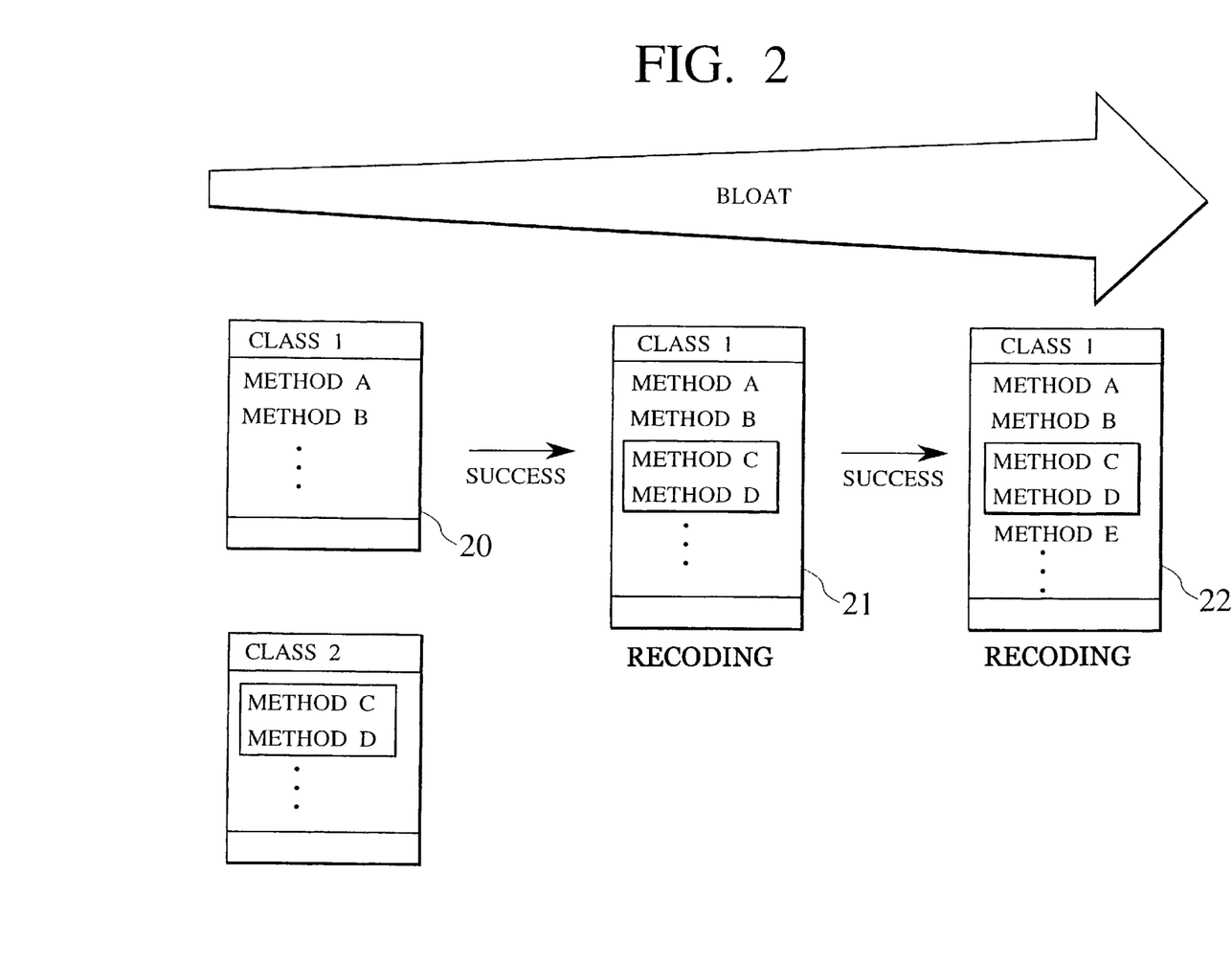
FIG. 2 is a standard illustration explaining the problems involved with the information processing method of a related art.

However, within the information processing system of a prior art, there are technical issues to be solved, which will be discussed below with reference to FIG. 2.

Firstly, because the information processing system of a prior art involves succession of the existing class 20 and then the addition of the new methods within it (see succession classes 21, 22), the class scale bloats with succession, and inhibits effective use of hardware resources. Also, it was not possible to make classes using only the necessary functions.

Secondly, in the information processing system of a prior art, because the user is required to add methods as is appropriate, it was difficult to effectively conduct sorting, and for this reason it was difficult to realize an information processing system that was productive and of high maintainability.

Thirdly, in the information processing system of a prior art, because the user performed method coding manually, efficiency was poor with procedures such as the recoding of methods that already existed (for example methods C and D in diagram), and because plural similar classes would thereby exist, it was difficult to efficiently build an information processing system.

SUMMARY OF THE INVENTION

The present invention has come about after thorough consideration of the above discussed issues, and the object of it is to provide an information processing system that effectively utilizes hardware resources and is highly productive and highly maintainable.

Another object of the present invention is to provide an information processing method that enables construction of an information processing system of productivity and maintainability, that effectively uses hardware.

A further object of the present invention is to provide a computer read-write memory medium that houses an information-processing program that enables construction of an information processing system of productivity and maintainability, that effectively uses hardware.

In light of the issues presented above, the inventor has come to think that by setting up a system inside the information processing system to enable reuse of methods inside classes, it is possible to construct a highly productive and highly maintainable information processing system that effectively uses hardware. After relentless research efforts the inventor has come to present technical ideology with the characteristics detailed below.

According to this invention, an information processing system is provided, which comprises the method display unit that displays the methods belonging to the classes, the method selection unit that selects the desired method from the methods displayed, the new class creator unit that makes the program source that indicates new classes using the selected method, the compiling processing unit that compiles the program source and creates the executable file, the information processing device that executes the executable file and conducts information processing defined by methods within the new classes.

Using these, a productive and highly maintainable information processing system can be built which makes effective use of hardware resources.

According to this invention, an information processing method is provided, which comprises the steps of displaying the methods belonging to the classes, selecting the desired methods from within those displayed, creating the source code that indicates the new class from within the selected method, creating the execution file, executing the execution file and conducts information processing defined by the method within the new class.

Using these, a productive and highly maintainable information processing system can be built which makes effective use of hardware resources.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

DETAILED DESCRIPTION OF THE PREFERRED EMBODIMENTS

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

First, the technical thinking behind this invention based on a computer readable memory device housing the information processing system and information processing system method will be explained with reference to FIG. 3.

Figure 3:
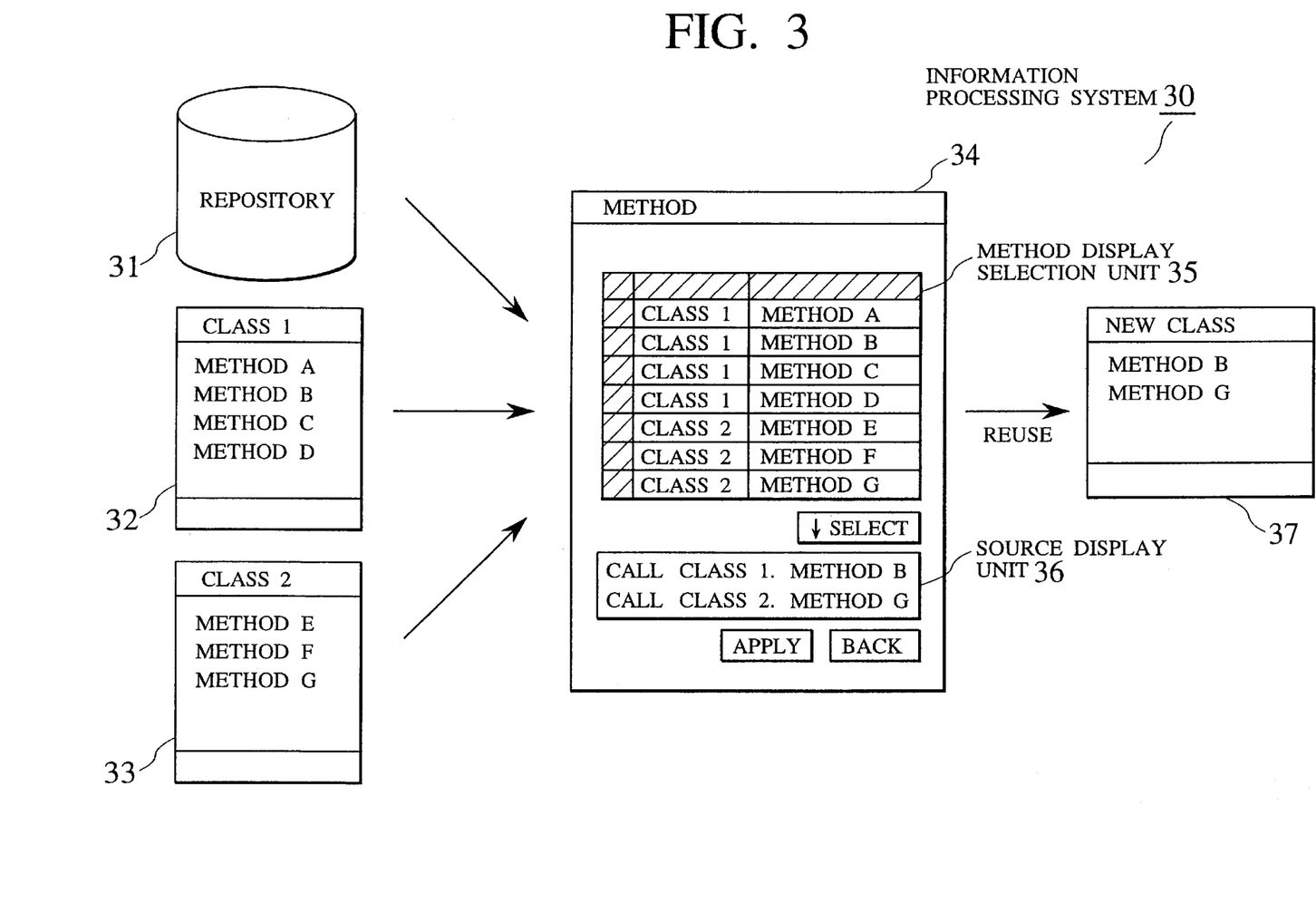
FIG. 3 is a conceptual illustration of the information process according to an embodiment of the present invention.

As indicated in FIG. 3, within this invention's information processing system, when selecting a method selected in the existing classes 32 and 33, which are housed in repository 31, and providing to the user a reusable environment, to then add a new method (function), this does not involve the succession of the actual class, but a method within the existing class is selected, reused, and a new 37 class is created which houses only the necessary functions.

According to such technological thinking, when adding a new method, coding on the behalf of the user is no longer necessary, and the information processing system can be built efficiently. Also, in contrast to information processing system of a related art, the system does not bloat, and as a result of this, efficient use of hardware becomes possible, and the productivity and maintainability of the information processing system is greatly improved.

Information Processing System

Figure 4:
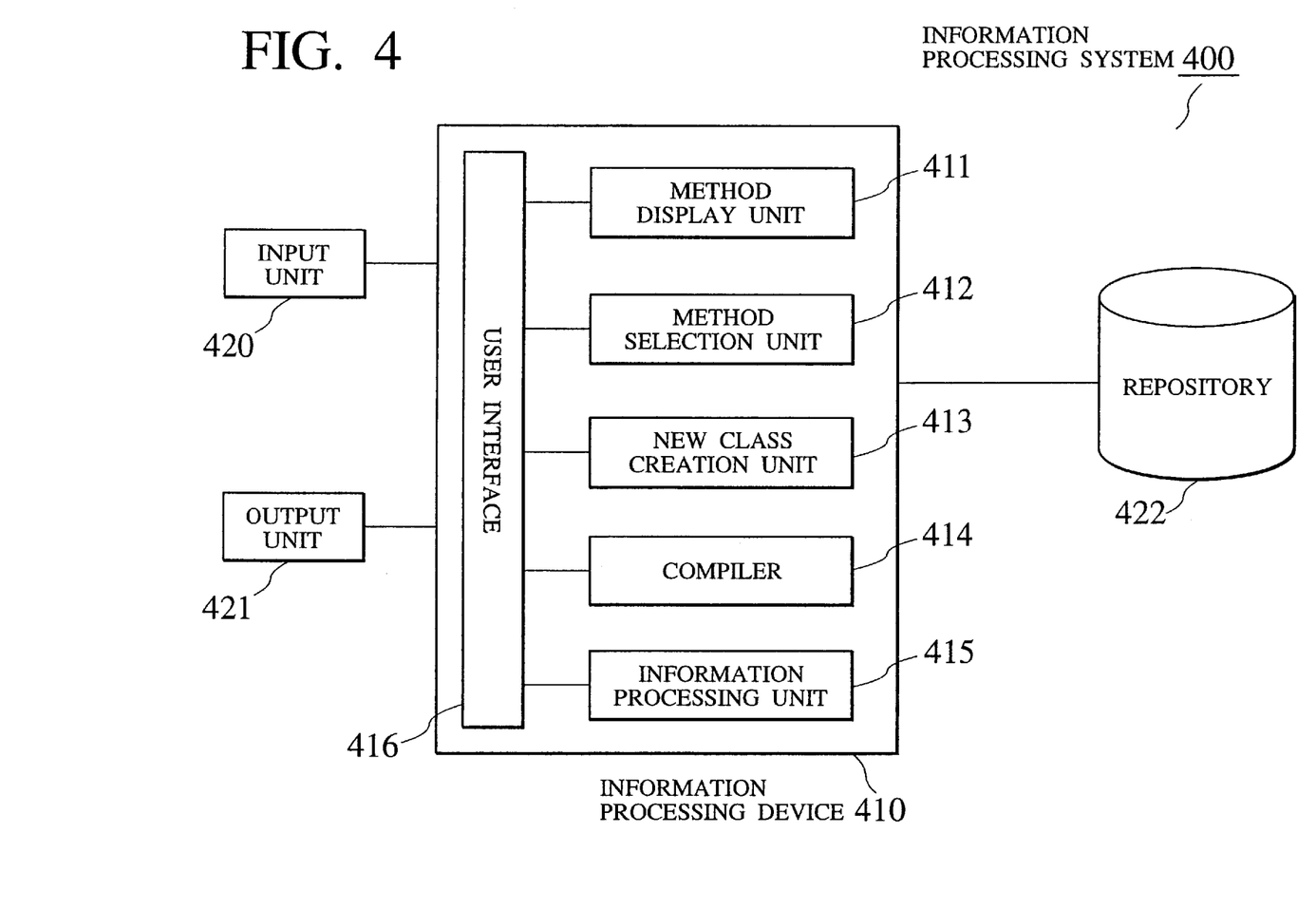
FIG. 4 is a block diagram indicating the information processing devices according to an embodiment of the present invention.

FIG. 4 is a block diagram indicating the information processing system according to an embodiment of the present invention.

As illustrated in FIG. 4, The information processing system according to an embodiment of the present invention comprises the information processing device 410 built using object oriented technology and a repository 422 housing class data.

The information processing device 410 further comprises the method display unit 411 that displays the method belonging to the class from within repository 422, the method selection unit 412 that selects the method displayed in method display unit 411, and the method selected within method selection unit 412, the new class creation unit 413 that creates the program source code that indicates the new class, the compiler 414 that compiles the source code and creates the execution file, the information processing unit 415 that executes the execution file and conducts the processing that is defined by method within the new class, the user interface that assists user manipulation of each composition element within the information processing device 410. Here it is best to employ a graphical user interface for the interface.

Also, the information-processing device 410 is connected to the input unit 420 for inputting the various types of parameters involved with the information-processing device 410 and method selection information, and the output unit 421 that is involved in the output of various types of information involved with the information-processing device. Here it is best to use devices such as keyboard, mouse and lightpen for the input unit, and advisable to apply devices such as a printer and display.

Information Processing Method

Figure 5:
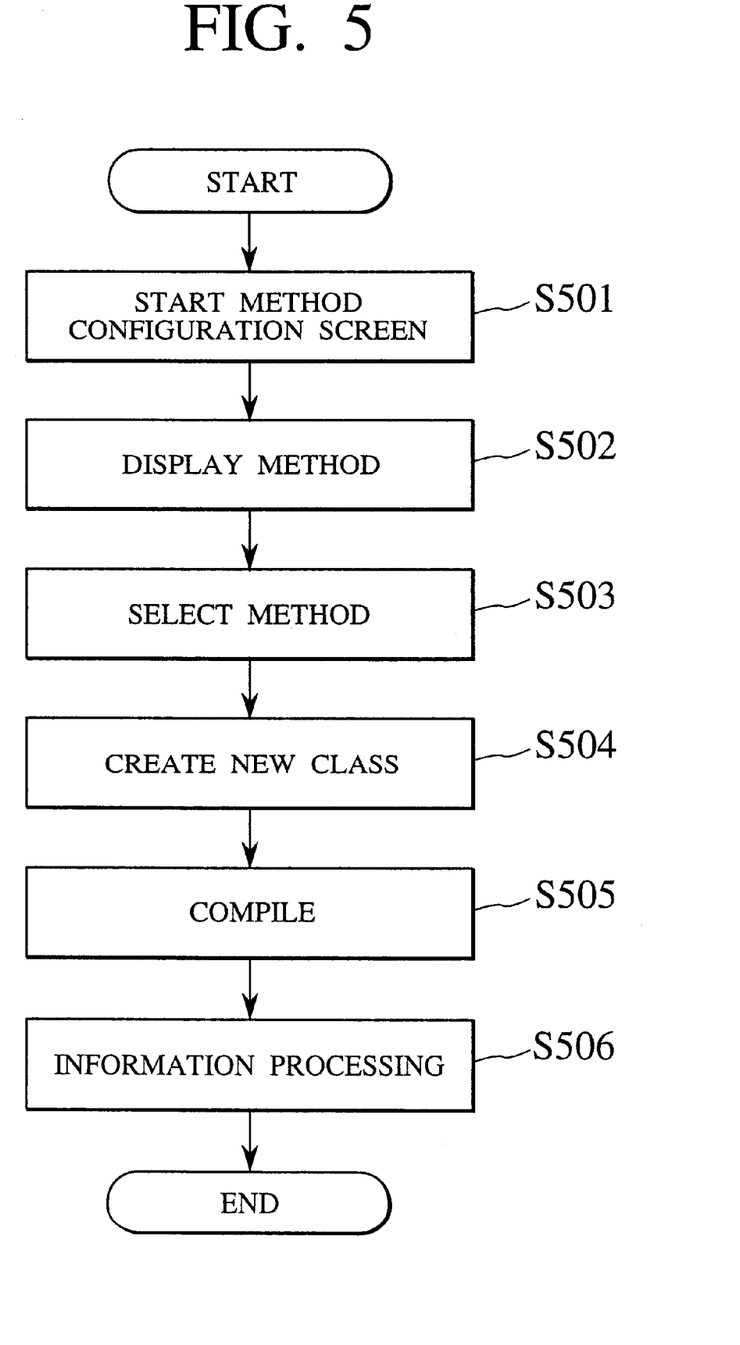
FIG. 5 is a flowchart diagram indicating the information processing methods according to an embodiment of the present invention.

FIG. 5 is a flowchart diagram indicating the information processing methods according to an embodiment of the present invention.

The information processing methods according to an embodiment of the present invention comprises the following steps:

(a) Start the method configuration screen for reuse of the methods from within existing classes (method configuration screen start step, S501). Here the method configuration screen uses the form as illustrated below, for example that in FIGS. 7 and 8. That is, the method configuration screen 70 (80) relating to this form of implementation is mainly composed of the method display and selection window 71 (81) and the source window 72 (83), and methods are reused via the screen.

Figure 7:
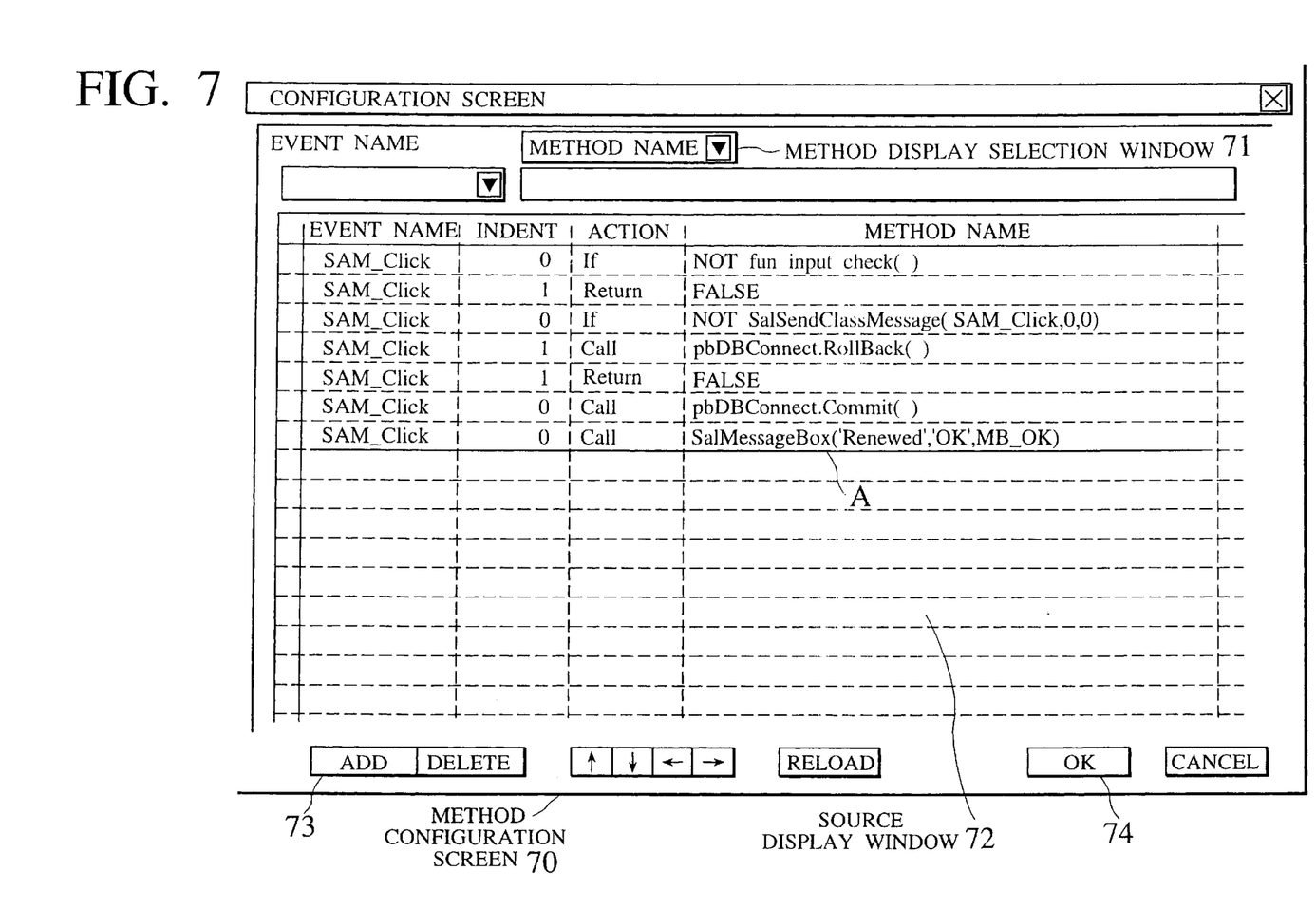
FIG. 7 is a diagram illustrating the method configuration screen devices according to the first embodiment of the present invention.
Figure 8:
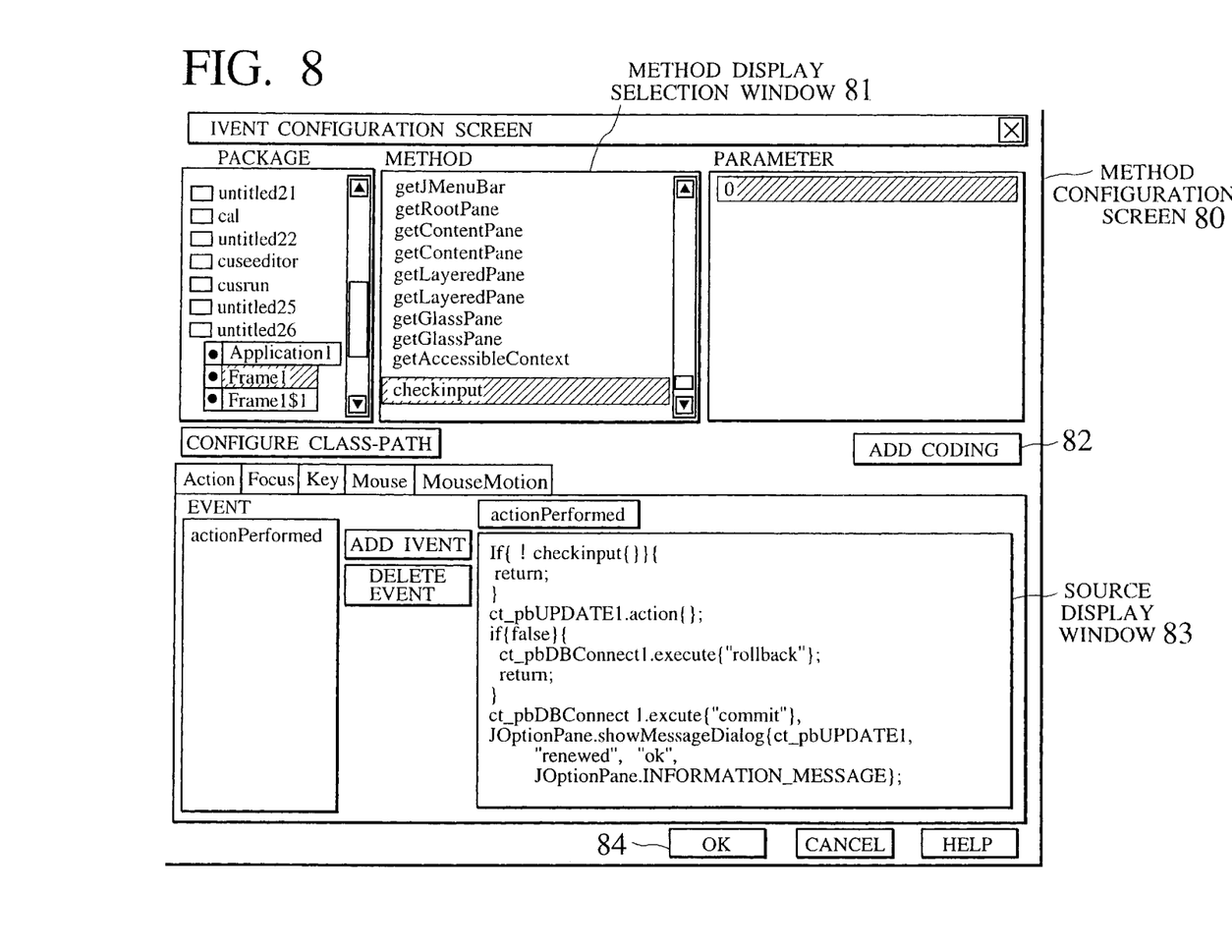
FIG. 8 is a diagram illustrating the method configuration screen devices according to an embodiment of the present invention.

(b) The method display unit 411 displays an overall view of the methods that are already coded in the method display and selection window 71 (81).

(c) Via the method display and method window 71 (81), the user selects the method desired, presses the "add" button 73 (82) (method selection part), and adds the selected method (method selection step) to the program source code (part A of FIG. 7).

(d) After the process of adding the method is completed, the "OK" button 74 (84) is pressed, and the new class creation unit 413 creates the program source code (new class creation step, S504) that is added to the selected method that indicates the new class.

(e) The compiling unit 414 compiles the program source code and creates the execution file (compiling step, S505).

(f) The information processing unit 415 executes the execution file and conducts the information processing defined by the method within the class (information processing step, S505).

In this way, using the information processing system and its methods according to an embodiment of the present invention, an overall view is possible via the method display and selection screen 71 (81) of the reusable methods, and only the necessary methods can be selected, thus making possible coding of classes including only the necessary classes. Also, because methods are reused, classes do not bloat, and methods can be sorted and organized according to use objectives, therefore making possible efficient use of the methods.

Computer Program Product

A program that realizes the information processing as described above may be stored on a recording medium. The program stored in the recording medium is read into a computer system, so that the above-described information processing can be realized by executing the program while controlling the computer. The recording medium includes such devices as a memory device, magnetic disk device, and an optical disk device, that are able to record the program. For example, the recording medium could be CD-ROM, DVD, ZIP, JAZ, MO, DAT, or the like.

Figure 6:
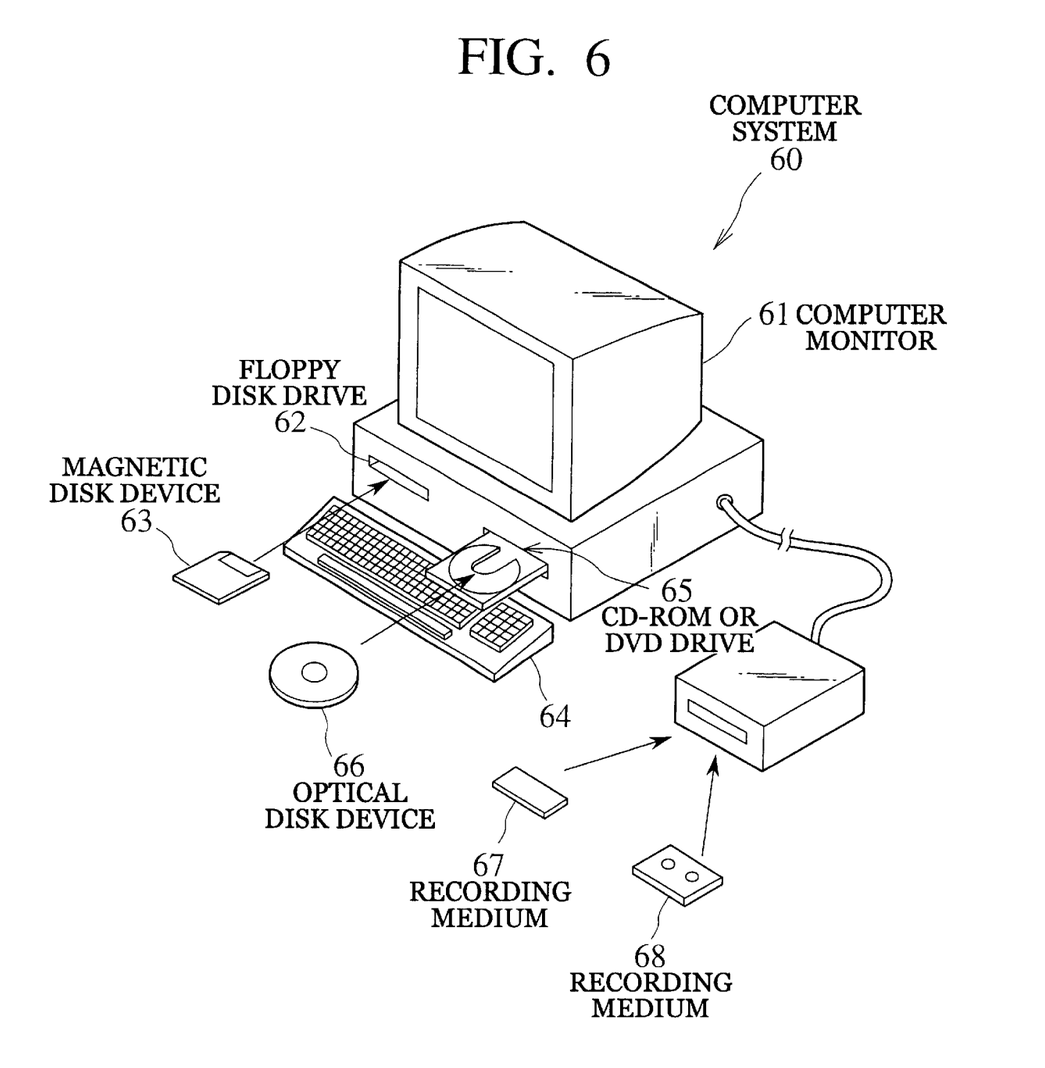
FIG. 6 is a diagram illustrating an overview of the information processing devices according to an embodiment of the present invention.

FIG. 6 schematically shows one example of a computer system 60 that reads a program stored in the recording medium, and performs information processing according to the procedure described in the program. The computer system 60 includes a monitor 61 and a main body. The computer system 60 is provided, at a front face of its main body, with a floppy disk drive 62, and CD-ROM or DVD drive 65. A drive device and a keyboard 64 are connected to the computer system 60. The drive device permits reading and writing of a recording medium 61 or 68, such as ZIP, JAZ, MO or DAT. A floppy disk as a magnetic disk device 63, or CD-ROM or DVD as an optical disk device 66, is inserted into each drive through a slot, and a certain reading operation is performed, so that the program stored in the recording medium can be installed in the computer system. Similarly, each type of medium may be inserted into a slot of the drive device, and a certain reading operation may be performed. In this manner, the information processing can be performed by the computer system 60.

The invention may be embodied in other specific forms without departing from the spirit or essential characteristics thereof. The present embodiments are therefore to be considered in all respects as illustrative and not restrictive, the scope of the invention is indicated by the appended claims rather than by the foregoing description, and all changes which come with the meaning and range of equivalency of the claims are therefore intended to be embraced therein.

What is claimed is:

1. A system for reusing a method belonging to an existing class in object oriented programs, the system comprising:
   a repository connected to an information processing device, configured to store a plurality of classes;
   the information processing device, including:
      a method display unit configured to generate a matching table stored in the repository and to display the matching table;
      a method selection unit configured to select and reuse a method from the matching table;
      a new class creation unit configured to create a program source code that indicates a new class using the selected method;
      a compiling unit configured to compile the program source code and to create an execution file; and
      an information processing unit configured to execute the execution file and to conduct an information processing defined by the selected method within the new class,
      wherein the new class includes the selected method and at least one other method selected from different classes.

2. The system of claim 1, wherein said matching table comprises:
   a list of an existing class name and a method name listed in the existing class.

3. The system of claim 1, wherein said matching table comprises:
   a list of at least two existing class names and at least two methods names listed in the existing classes.

4. The system of claim 1, further comprising:
   an input unit configured to input parameters related to the information processing device; and
   an output unit configured to output information related to the information processing device.

5. The system of claim 4, wherein said output unit is a display system.

6. The system of claim 1, further comprising:
   a user interface configured to assist the handling of the information processing.

7. The system of claim 6, wherein said user interface is a graphical user interface.

8. The system of claim 7, further comprising:
   an input unit configured to input parameters related to the information processing device; and
   an output unit configured to output information related to the information processing device.

9. The system of claim 8, wherein said output unit is a display system.

10. The system of claim 6, further comprising:
    an input unit configured to input parameters related to the information processing device; and
    an output unit configured to output information related to the information processing device.

11. The system of claim 10, wherein said output unit is a display system.

12. A method for reusing a method belonging to an existing class in object oriented programs, the method comprising:
    generating a matching table, wherein an existing class and methods associated with the class are listed;
    displaying the matching table;
    selecting and reusing a method from the matching table for creating a new class;
    creating a program source code based on the selected method;
    compiling the program source code and creating an execution file; and
    executing the execution file and conducting an information; and processing defined by the methods within the new class,
    wherein the methods for the new class are selected from different classes.

13. A computer program product for reusing a method belonging to an existing class in object oriented programs, the computer program product comprising:
    instructions embodied within a storage medium for generating a matching table, wherein an existing class and methods associated with the class are listed;
    instructions embodied within the storage medium for displaying the matching table;
    instructions embodied within the storage medium for selecting and reusing a method from the matching table for creating a new class;
    instructions embodied within the storage medium for creating a program source code based on the selected method;
    instructions embodied within the storage medium for compiling the program source code and creating an execution file; and
    instructions embodied within the storage medium for executing the execution file and conducting an information processing defined by the methods within the new class,
    wherein the methods for the new class are selected from different classes.

* * * * *